(12) United States Patent
Jobs et al.

(10) Patent No.: US 10,457,006 B2
(45) Date of Patent: Oct. 29, 2019

(54) TURN-UP DEVICE FOR TYRE SIDE WALLS

(71) Applicant: Harburg-Freudenberger Maschinenbau GmbH, Hamburg (DE)

(72) Inventors: Christopher Jobs, Uelzen (DE); Susanne Wilkens, Buchholz (DE); Werner Wedekind, Salzhausen (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 525 days.

(21) Appl. No.: 14/439,467

(22) PCT Filed: Jun. 13, 2013

(86) PCT No.: PCT/DE2013/000322
§ 371 (c)(1),
(2) Date: Apr. 29, 2015

(87) PCT Pub. No.: WO2014/015845
PCT Pub. Date: Jan. 30, 2014

(65) Prior Publication Data
US 2015/0239191 A1   Aug. 27, 2015

(30) Foreign Application Priority Data

Jul. 27, 2012   (DE) ........................ 10 2012 014 987

(51) Int. Cl.
*B29D 30/32*   (2006.01)
*B29D 30/24*   (2006.01)
*B29D 30/26*   (2006.01)

(52) U.S. Cl.
CPC ............. *B29D 30/32* (2013.01); *B29D 30/24* (2013.01); *B29D 30/244* (2013.01);
(Continued)

(58) Field of Classification Search
CPC .................. B29D 30/18; B29D 30/32; B29D 2030/3221; B29D 2030/3257; B29D 2030/3264
See application file for complete search history.

(56) References Cited

U.S. PATENT DOCUMENTS

| 1,467,142 A | * | 9/1923 | Denmire | ............... B29D 30/12 156/420 |
| 2,935,117 A | * | 5/1960 | Pfeiffer | ............... B29D 30/245 156/132 |

(Continued)

FOREIGN PATENT DOCUMENTS

| DE | 10300969 A1 | 7/2004 |
| EP | 1650012 A1 | 4/2006 |

(Continued)

*Primary Examiner* — Joseph S Del Sole
*Assistant Examiner* — Cedrick S Williams
(74) *Attorney, Agent, or Firm* — Lucas & Mercanti, LLP; Klaus P. Stoffel

(57) ABSTRACT

A device is disclosed for turning up the side walls of tyres on a shaping drum for shaping a tyre carcase, the spindle arrangement of which has a central spindle and at least two side spindles running in parallel, between which the central spindle extends, wherein the central spindle and the side spindles are drivable in a mutually independent manner and the core clamping devices are allocated to the central spindle and the turn-over devices are allocated to the side spindles or the turn-over devices are allocated to the central spindle and the core clamping devices are allocated to the side spindles.

9 Claims, 2 Drawing Sheets

(52) U.S. Cl.
CPC ........... *B29D 30/245* (2013.01); *B29D 30/26* (2013.01); *B29D 2030/3264* (2013.01)

(56) References Cited

U.S. PATENT DOCUMENTS

| | | | | |
|---|---|---|---|---|
| 3,374,138 | A * | 3/1968 | Porter | B29D 30/24 |
| | | | | 156/132 |
| 3,867,231 | A * | 2/1975 | Casey | B29D 30/245 |
| | | | | 156/132 |
| 4,859,272 | A * | 8/1989 | Lovell | B29D 30/243 |
| | | | | 156/415 |
| 6,837,292 | B2 * | 1/2005 | De Graaf | B29D 30/245 |
| | | | | 156/402 |
| 7,144,466 | B2 | 12/2006 | Jungk | |
| 7,520,949 | B2 * | 4/2009 | Ogawa | B29D 30/20 |
| | | | | 156/110.1 |
| 2007/0095481 | A1 * | 5/2007 | Graaf | B29D 30/242 |
| | | | | 156/414 |
| 2009/0133842 | A1 * | 5/2009 | Grolleman | B29D 30/245 |
| | | | | 156/415 |
| 2009/0178766 | A1 * | 7/2009 | Marangoni | B29D 30/005 |
| | | | | 156/415 |
| 2010/0122775 | A1 * | 5/2010 | De Graaf | B29D 30/32 |
| | | | | 156/415 |

FOREIGN PATENT DOCUMENTS

| | | | |
|---|---|---|---|
| EP | 2217433 B1 | 8/2010 | |
| WO | 2007093905 A1 | 8/2007 | |
| WO | WO 2009/070020 * | 6/2009 | ............ B29D 30/24 |
| WO | 2011065829 A1 | 6/2011 | |

* cited by examiner

TURN-UP DEVICE FOR TYRE SIDE WALLS

The present application is a 371 of international application PCT/DE2013/000322, filed Jun. 13, 2013, which claims priority of DE 10 2012 014 987.5, filed Jul. 27, 2012, the priority of these applications is hereby claimed and these applications are incorporated herein by reference.

BACKGROUND OF THE INVENTION

The invention relates to an apparatus for turning up tire side walls on a shaping drum for the shaping of a tire carcass.

An apparatus of said type is presented for example in DE 103 00 969 A1. Said apparatus has two core clamping devices for receiving in each case one bead core, two turn-over devices with a multiplicity of spreadable fingers or levers, and a spindle arrangement for the synchronous axial movement of the core clamping devices in opposite directions and for the synchronous axial movement of the turn-over devices in opposite directions independently of the core clamping devices. The spindle arrangement has a central spindle for driving the turn-over devices and has a hollow spindle, mounted on the central spindle, for the actuation of the core clamping devices. The spindles can be connected to one another by way of a coupling and can be driven by way of a motor that acts on the central spindle. The design of the hollow spindle and the coaxial mounting of the spindles however necessitate high outlay in terms of manufacture and apparatus.

The European patent EP 2 217 433 B1 presents a turn-over apparatus for tire side walls, the spindle arrangement of which has a spindle pair with two parallel spindles. One spindle drives core clamping devices, and the other spindle drives turn-over devices. Said turn-up apparatus duly dispenses with a hollow spindle and is thus, from a manufacturing aspect, simpler to manufacture than the above-described turn-up apparatus according to DE 103 00 969 A1, but the sliding forces imparted by the spindles are not introduced symmetrically into the core clamping devices and the turn-over devices. As a result, it is possible for the respective bead cores to become orientated obliquely with respect to one another, which, during the shaping process, yields an uneven elevation of the tire carcass and thus uneven contact with the respective belt pack. This can result in the tires exhibiting a non-uniform mass distribution. Furthermore, the asymmetrical introduction of force results in high reaction forces being exerted on the shaping drum by the core clamping devices and by the turn-over devices, resulting in increased wear and a short service life.

SUMMARY OF THE INVENTION

It is an object of the invention to provide an apparatus for turning up tire side walls on a shaping drum for the shaping of a tire carcass, which apparatus eliminates the abovementioned disadvantages and, with reduced outlay in terms of manufacture and apparatus, permits a symmetrical introduction of force into core clamping devices and turn-over devices.

An apparatus according to the invention for turning up tire side walls on a shaping drum for the shaping of a tire carcass has two core clamping devices, two turn-over devices and a spindle arrangement for the synchronous axial movement of the core clamping devices in opposite directions and for the synchronous axial movement of the turn-over devices in opposite directions independently of the core clamping devices. According to the invention, the spindle arrangement has a central spindle and two synchronously running side spindles between which the central spindle runs, wherein the core clamping devices are assigned to the central spindle and the turn-over devices are assigned to the side spindles, or the turn-over devices are assigned to the central spindle and the core clamping devices are assigned to the side spindles.

An apparatus of said type is characterized by a symmetrical introduction of force into the core clamping devices and into the turn-over devices, while involving low outlay in terms of apparatus. In this way, optimum lateral runout of the core clamping devices and of the turn-over devices is realized. Obliquity of the core clamping devices, and thus obliquity of the bead cores borne by the core clamping devices during the shaping process, does not arise. The tire carcass cannot form uneven elevations, such that a tire shaped by means of the apparatus according to the invention has a uniform mass distribution. At the same time, the symmetrical introduction of force results in lower reaction forces being exerted on the shaping drum by the core clamping devices and the turn-over devices, such that the apparatus according to the invention is characterized by low wear and thus a long service life.

It is preferably the case that, on the central spindle, there are guided two spindle nuts which each have at least two drivers for interacting with in each case one of the devices associated with the central spindle, wherein the drivers are distributed uniformly in a circumferential direction. In this way, the devices associated with the central spindle and the spindle nuts are, with minimal outlay in terms of apparatus, subjected to axially symmetrical load. In the case of, for example, two drivers per device, said drivers are oriented oppositely to one another in relation to the respective spindle nut, or are arranged offset with respect to one another at an angle of 180°. In the case of, for example, three drivers per device, said drivers are arranged offset with respect to one another at an angle of 120°.

It is preferably the case that, on the side spindles, there are guided in each case two spindle nuts which form two parallel-running spindle nut pairs and which each have at least one driver for interacting with one of the devices associated with the side spindles, wherein each device associated with the side spindles is assigned a spindle nut pair, of which at least both drivers are distributed uniformly in the circumferential direction. In this way, the devices associated with the side spindles are, with minimal outlay in terms of apparatus, subjected to axially symmetrical load. By virtue of the fact that the at least two drivers of a device associated with the side spindles are distributed uniformly in the circumferential direction, the respective spindle nuts of a device are subjected to load on identical circumferential sections, whereby a high degree of synchronism of the in each case parallel-running spindle nuts is attained.

In one embodiment, the two nuts of a spindle nut pair are connected to one another. In this way, unilateral loading of the nuts is prevented.

The central spindle is preferably mounted centrally between the side spindles on a drum axis. In this way, it is possible for the drivers of the core clamping devices to be designed to be of equal length, and for the drivers of the turn-over devices to be designed to be of equal length, whereby the spindle nuts that mesh with the central spindle do not become misaligned during the displacement. Furthermore, the spindle nuts of the side spindles are subjected to equal loading, such that they exhibit a high degree of axial synchronism and are always situated in a common axial setpoint position.

It is preferable for in each case two drivers to be provided for one of the devices, wherein the drivers of the core clamping devices and the drivers of the turn-over devices are oriented orthogonally with respect to one another.

The core clamping devices are preferably mounted on a drum housing which engages around the spindle arrangement and which has slots through which the drivers are guided. The drum housing permits stable guidance of the clamping devices close to the drum axis, such that the drivers can be designed to be correspondingly short and thus correspondingly rigid.

It is preferable for each turn-over device to be mounted on a section of a sliding bushing which engages around the drum housing and which connects the respective core clamping device to the drivers thereof and which has slots for the leadthrough of the drivers of the devices associated with the side spindles. In this way, the drivers for the devices associated with the central spindle are situated axially at the outside as viewed from a drum center, and the drivers for the devices associated with the side spindles are situated axially at the inside, even though the devices associated with the side spindles are arranged axially at the outside in relation to the devices associated with the central spindle. This permits the production of tires that differ considerably in size. It is not necessary for the shaping drum shaft to be changed, or for an alternative shaping drum shaft to be provided in order to cover a particular size range. In this way, it is possible to produce small manufacturing batches with considerably different tire sizes without time-consuming changeover work. The different tire sizes may lie in the range from 17.5 to 24.5 inches. For adaptation to the different tire sizes, it is merely necessary to change in each case the core clamping arrangement and the finger cages.

The outlay in terms of control and regulation for the apparatus and/or the spindle arrangement can be reduced by virtue of the side spindles being operatively connected to one another by way of a coupling. Thus, only one drive is necessary for driving the side spindles. The side spindles may in turn be coupled to the central spindle, such that only one drive is required for actuating all of the spindles. Alternatively, however, in the case of coupled side spindles, the central spindle may also be driven by way of a dedicated drive. Furthermore, it is also possible for each spindle to be equipped with a dedicated drive, wherein the two dedicated drives of the side spindles are then actuated so as to be driven synchronously.

A preferred exemplary embodiment of the invention will be discussed in more detail below on the basis of schematic illustrations, in which:

DETAILED DESCRIPTION OF THE INVENTION

Figure 1:
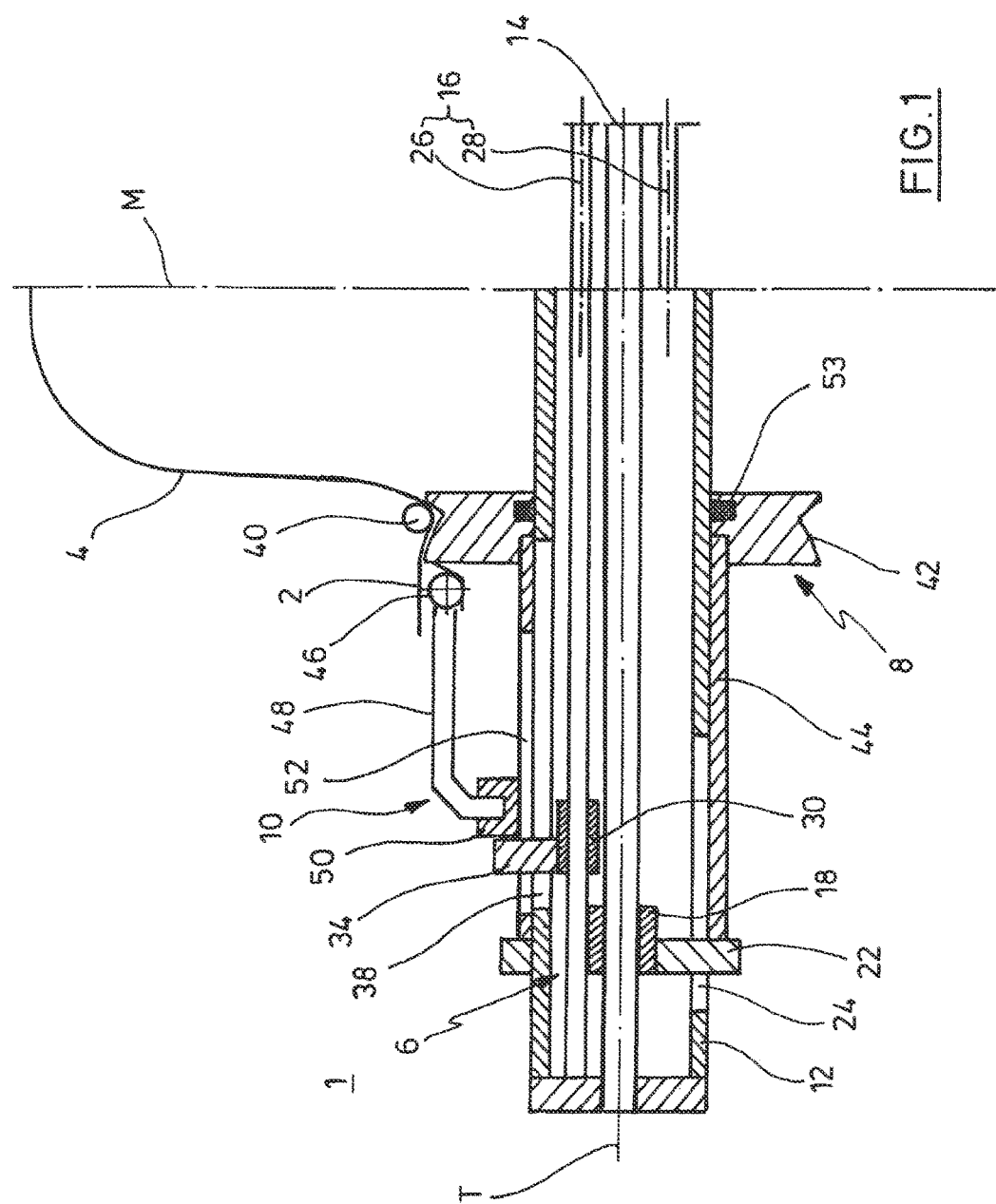
FIG. 1 shows an angled longitudinal section through one side of an apparatus according to the invention.
Figure 2:
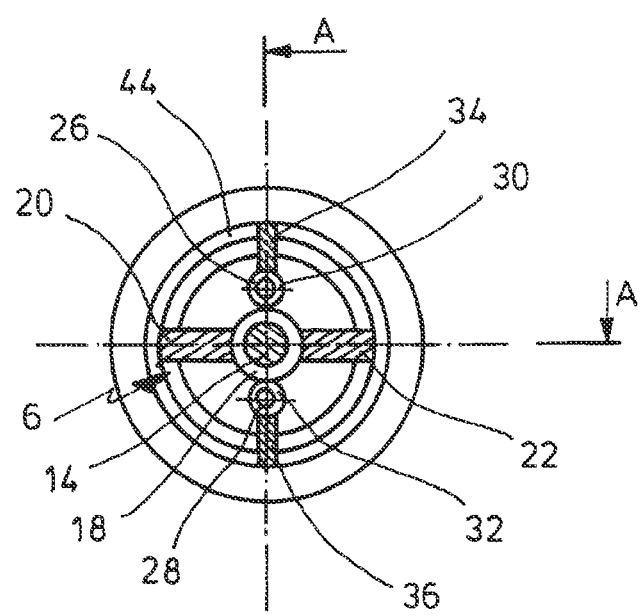
FIG. 2 shows a cross section through a shaping drum of the apparatus.

FIG. 1 shows a partial section, along the section line A-A indicated in FIG. 2, of an apparatus 1 according to the invention for turning up side walls 2 on a shaping drum for the shaping of a tire carcass 4. The apparatus 1 is designed to be symmetrical about the drum center M and symmetrical about the drum axis T. The drum axis T runs orthogonally with respect to the drum center M and extends in a longitudinal direction of the apparatus 1 or shaping drum. The apparatus 1 has a spindle arrangement 6 and two core clamping devices 8 and two turn-over devices 10, of which in each case only one device 8, 10 is illustrated owing to the partial sectional illustration.

The spindle arrangement 6 is formed so as to extend all the way through the shaping drum and is axially symmetrical about the drum axis T. On its side (not shown) situated on the other side of the drum center M, the second clamping device is mounted mirror-symmetrically with respect to the first clamping device 8, and the second turn-over device is mounted mirror-symmetrically with respect to the first turn-over device 10. Said spindle arrangement is arranged in a drum housing 12 of the shaping drum, said drum housing being closed at the face side. Said spindle arrangement has a central spindle 14 and a side spindle pair 16.

The central spindle 14 forms, by way of its axis of rotation, the drum axis T. Said central spindle serves, in the exemplary embodiment shown, for the synchronous and concurrent axial displacement of the core clamping devices 8. For this purpose, the central spindle has two opposing threaded sections which are arranged in each case on one side of the drum center M and which have an equal pitch. On the threaded sections there is guided in each case one spindle nut 18, which has two radial drivers 20, 22 pointing in opposite directions (see FIG. 2). The drivers 20, 22 are designed to be of equal length, and are led in each case through a slot 24 in the drum housing 12.

As shown in FIG. 2, the side spindle pair 16 has an upper side spindle 26 and a lower side spindle 28. The side spindles 26, 28 are preferably connected to one another by way of a coupling (not shown) and are in synchronism. They thus act, in effect, as a single spindle. In the exemplary embodiment shown, they serve for driving the turn-over device 10, and for this purpose, have in each case two opposing threaded sections which are arranged in each case on one side of the drum center M. For the synchronous axial displacement of the turn-over devices 10 relative to one another, the threaded sections each have an equal pitch.

If the side spindles 26, 28 are mechanically coupled to one another by means of the coupling, only one drive is provided for driving the side spindles 26, 28. The side spindles 26, 28 can in turn be detachably coupled to the central spindle 14, such that only one drive is required for the actuation of all of the spindles 14, 26, 28. Alternatively, however, in the case of coupled side spindles 26, 28, it is also possible for the central spindle 14 to have a dedicated drive. It is furthermore also possible for each spindle 14, 26, 28 to be equipped with a dedicated drive, wherein the two dedicated drives of the side spindles 26, 28 are then actuated so as to be driven synchronously. It is essential that the side spindles 26, 28 are operated synchronously, and that the side spindles 26, 28 and the central spindle 14 are driven such that the turn-over devices 10, which in this exemplary embodiment are associated with the side spindles, can be moved axially independently of the core clamping devices 8, which in this exemplary embodiment are associated with the central spindle.

On the threaded sections there is guided in each case one spindle nut 30, 32 which has in each case one driver 34, 36.

Thus, each turn-over device 10 is assigned a parallel-running spindle nut pair, the two drivers of which 34, 36 are arranged in alignment with one another. The drivers 34, 36 are designed to be of equal length and, in connected fashion, are guided in each case through a slot 38 of the drum housing 12 and of the sliding bushing.

As shown in FIG. 2, the central spindles 14 and the side spindles 26, 28 are arranged in a plane, in particular in a vertical plane, wherein the central spindle 14 runs centrally between the side spindles 26, 28. As is likewise shown in FIG. 2, the drivers 20, 22 of the respective core clamping device 8 and the drivers 34, 36 of the respective turn-over device 10 are oriented orthogonally with respect to one another. Here, in the case of the positioning of the drum shaft as per FIG. 2, the drivers 20, 22 of the core clamping device 8 extend in a horizontal direction and the drivers 34, of the turn-over device 10 correspondingly extend in a vertical direction. Planes defined in each case by the drivers 20, 22 and 34, 36 run at right angles to one another.

As shown in FIG. 1, the core clamping devices 8 serve in each case for bearing a bead core 40 and for setting an axial distance between the bead cores 40 situated to the sides of the drum center M. Said core clamping devices each have an annular body 42 which is guided on the drum housing 12 and which is connected to the drivers 20, 22 by means of a sliding bushing 44, which is likewise guided on the drum housing 12. Furthermore, the annular bodies 42 have a support ring 46, which faces away from the drum center M and faces toward the respective turn-over device 10, for supporting, at the head side, spreadable fingers 48 in their rest position of the turn-over devices 10.

The turn-over devices 10 are so-called finger cages which have in each case one annular body 50 and a multiplicity of the fingers 48 or arms or levers, which are articulatedly connected, at the foot side, to the annular body 50. The annular bodies 50 are guided on the sliding bushing 44 and thus between the core clamping device 8 and the drivers 20, 22 thereof. The drivers 34, 36, which engage on the annular body 50, are guided through in each case one slot 52 in the sliding bushing 44. In this way, the drivers 20, 22 for the core clamping devices 8 are situated axially at the outside as viewed from the drum center M, and the drivers 34, 36 for the turn-over devices 10 are situated axially at the inside, even though the turn-over devices 10 are arranged axially at the outside in relation to the core clamping devices 8.

A preferred shaping process will be discussed below: at the start of the process, the tire carcass 4 is shaped. For this purpose, the central spindle 14 is driven such that the core clamping devices 8 and thus the bead cores 40 are moved from an initial position toward the drum center M. Furthermore, the side spindles 26, 28 are actuated such that the turn-over devices 10 are moved by the same movement distance from their initial position toward the drum center M, correspondingly to the core clamping devices 8.

After the shaping of the tire carcass 4, the actuation of the central spindle 14 is stopped. Then, the side walls 2 are turned up synchronously against the tire carcass 4. For this purpose, the side spindles 26, 28 are actuated such that the turn-over devices 10 are moved further in the direction of the drum center M and thus in the direction of the core clamping devices 8. The fingers 48 are moved radially outward, away from the support rings 46, and run so as to drive along the side walls 2, which extend approximately coaxially with respect to the drum axis T, up the tire carcass 4. The fingers 48 are spread apart, wherein they press the side walls 2, which are driven along, against the tire carcass 4.

After the turning-up of the side walls 2, the tire carcass is removed from the apparatus 1, and supplied for further processing steps. The core clamping devices 8 and the turn-over devices 10 are moved back into their respective initial position.

In the exemplary embodiment shown in the figures, the core clamping devices 8 are assigned to the central spindle 14, and the turn-over devices 10 are assigned to the side spindle pair 16. It is however also possible for the core clamping devices to be assigned to the side spindle pair 16, and for the turn-over devices 10 to be assigned to the central spindle 14. For this purpose, the drivers 20, 22 of the core clamping devices 8 must be assigned to the turn-over devices 10, and the drivers 34, 36 of the turn-over devices 10 must be assigned to the core clamping devices 8. Furthermore, the timing of the activation or actuation of the central spindle 14, and the timing of the activation or actuation of the side spindle pair 16, must be correspondingly adapted.

The invention discloses an apparatus for turning up tire side walls on a shaping drum for the shaping of a tire carcass, the spindle arrangement of which apparatus has a central spindle and at least two synchronous side spindles, between which the central spindle runs, wherein the central spindle and the side spindles can be driven independently of one another, and the core clamping devices are assigned to the central spindle and the turn-over devices are assigned to the side spindles, or the turn-over devices are assigned to the central spindle and the core clamping devices are assigned to the side spindles.

FIG. 1 shows a seal 53 which serves for sealing off the internal pressure of the carcass or of the tire with respect to the atmosphere. Owing to the mounting of the finger cage on the sliding bushing 44, the slots in the drum shaft can be arranged such that, for the largest tire, the position of the seal 53 still remains on the closed region of the shaft. The largest tire is assigned the greatest distance between the seal 53 and the drum center M. Here, the slots make it possible to realize the small distance required for the smallest tire between the core clamping arrangement and finger cage and the drum center M.

The invention claimed is:

1. An apparatus for turning up tire side walls on a shaping drum for shaping a tire carcass, comprising: two core clamping devices; two turn-over devices; and a spindle arrangement for synchronous movement of the core clamping devices axially in opposite directions and for synchronous movement of the turn-over devices axially in opposite directions independently of the core clamping devices, wherein the spindle arrangement has a central spindle and two synchronously running side spindles between which the central spindle extends, wherein the core clamping devices are in transmission connection with the central spindle and the turn-over devices are in transmission connection with the side spindles, or the turn-over devices are in transmission connection with the central spindle and the core clamping devices are in transmission connection with the side spindles, wherein two first spindle nuts are guided on the central spindle, each of the first spindle nuts has at least two first drivers that respectively transmit a driving, force from the spindle nut to one of the devices associated with the central spindle, wherein the drivers are distributed uniformly in a circumferential direction of the drum, wherein the central spindle has two opposing threaded sections, one of the first spindle nuts being arranged on each of the threaded sections, wherein each of the side spindles has two opposing threaded sections, wherein a second spindle nut having a second driver is respectively arranged on each of the threaded sections of the side spindles.

2. The apparatus as claimed in claim 1, wherein two side spindle nuts are guided on each of the side spindles and form two parallel running side spindle nut pairs, each of the side spindle nuts has at least one driver that transmits a driving force from the side spindle nut to one of the devices associated with the side spindles, wherein each device associated with the side spindles is assigned one of the side spindle nut pairs, wherein the drivers of each side spindle nut pair are distributed uniformly in a circumferential direction of the drum.

3. The apparatus claimed in claim 1, wherein the central spindle is mounted centrally between the side spindles on a drum axis.

4. The apparatus as claimed in claim 1, wherein the side spindles are operatively connected to one another by a coupling.

5. The apparatus as claimed in claim 1, wherein the core clamping devices are mounted on a drum housing which extends around the spindle arrangement and which has slots through which the drivers are guided.

6. The apparatus as claimed in claim 5, wherein each turn-over device is mounted on a section of a sliding bushing which engages around the drum housing and which connects the respective core clamping device to the drivers thereof and which has slots for leadthrough of the drivers associated with the side spindles.

7. The apparatus as claimed in claim 6, wherein the sliding bushing is sealed off by a seal.

8. The apparatus as claimed in claim 2, wherein the side spindle nuts of a pair are connected to one another.

9. The apparatus as claimed in claim 2, wherein the at least two drivers of the spindle nuts on the central spindle are oriented orthogonally to the two drivers of the side spindle nuts.

\* \* \* \* \*